United States Patent [19]

Pache et al.

[11] 4,443,686

[45] Apr. 17, 1984

[54] DEVICE FOR ARC-WELDING FERROMAGNETIC WORKPIECES UNDER THE CONTROL OF A MAGNETIC FIELD

[75] Inventors: Norbert Pache, Augsburg; Karel Mazac, Friedberg, both of Fed. Rep. of Germany

[73] Assignee: Kuka Schweissanlagen+Roboter GmbH, Augsburg, Fed. Rep. of Germany

[21] Appl. No.: 368,168

[22] Filed: Apr. 14, 1982

[30] Foreign Application Priority Data

Apr. 15, 1981 [DE] Fed. Rep. of Germany ....... 3115338

[51] Int. Cl.³ ............................................. B23K 9/08
[52] U.S. Cl. ................................ 219/123; 219/60 R; 219/101
[58] Field of Search ...................... 219/123, 60 R, 101, 219/136, 161

[56] References Cited

U.S. PATENT DOCUMENTS

| 3,941,974 | 3/1976 | Kano et al. ................. 219/123 X |
| 4,273,986 | 6/1981 | Edson et al. ..................... 219/123 |

FOREIGN PATENT DOCUMENTS

| 1565914 | 7/1970 | Fed. Rep. of Germany . |
| 2357602 | 6/1974 | Fed. Rep. of Germany . |
| 2352842 | 8/1978 | Fed. Rep. of Germany . |
| 95737 | 2/1973 | German Democratic Rep. . |
| 147638 | 4/1981 | German Democratic Rep. ................... 219/123 |
| 367980 | 3/1973 | U.S.S.R. ......................... 219/123 |

Primary Examiner—B. A. Reynolds
Assistant Examiner—Catherine M. Sigda
Attorney, Agent, or Firm—Karl F. Ross; Herbert Dubno

[57] ABSTRACT

Two coaxially aligned workpieces of ferromagnetic material, axially separated by a narrow peripheral gap across which a weld seam is to be formed with the aid of an arc moving along that gap, are engaged by holders including at least one set of two or more ferromagnetic gripper jaws whose confronting faces are magnetized with like polarity by respective excitation windings surrounding extensions of these jaws. The resulting magnetic field extends axially within the workpiece held by the gripper jaws in a loop which passes generally radially through the peripheral gap, either on account of a bucking magnetic field (which may be generated by a similar set of jaws gripping the other workpiece) or by virtue of pole shoes of the opposite polarity juxtaposed with the jaw extensions and approaching the gap.

8 Claims, 11 Drawing Figures

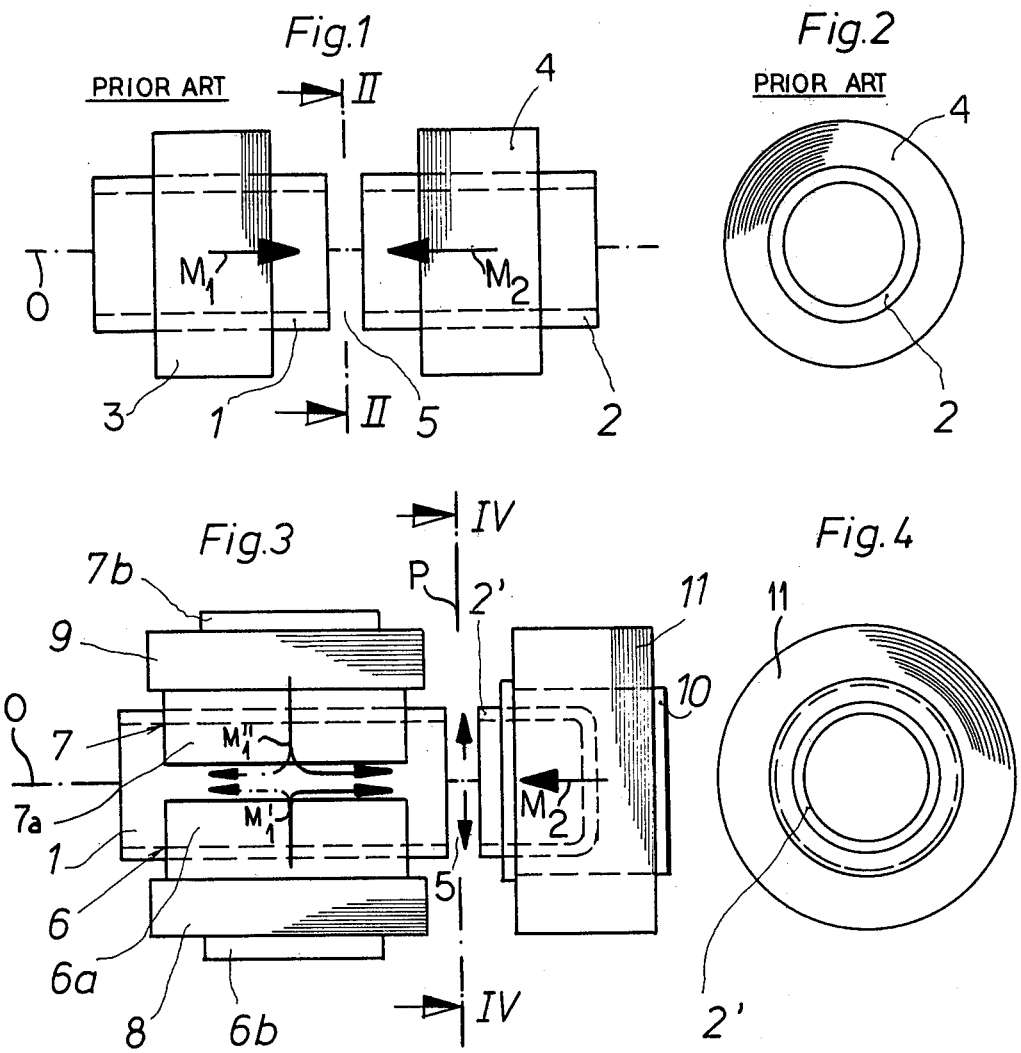

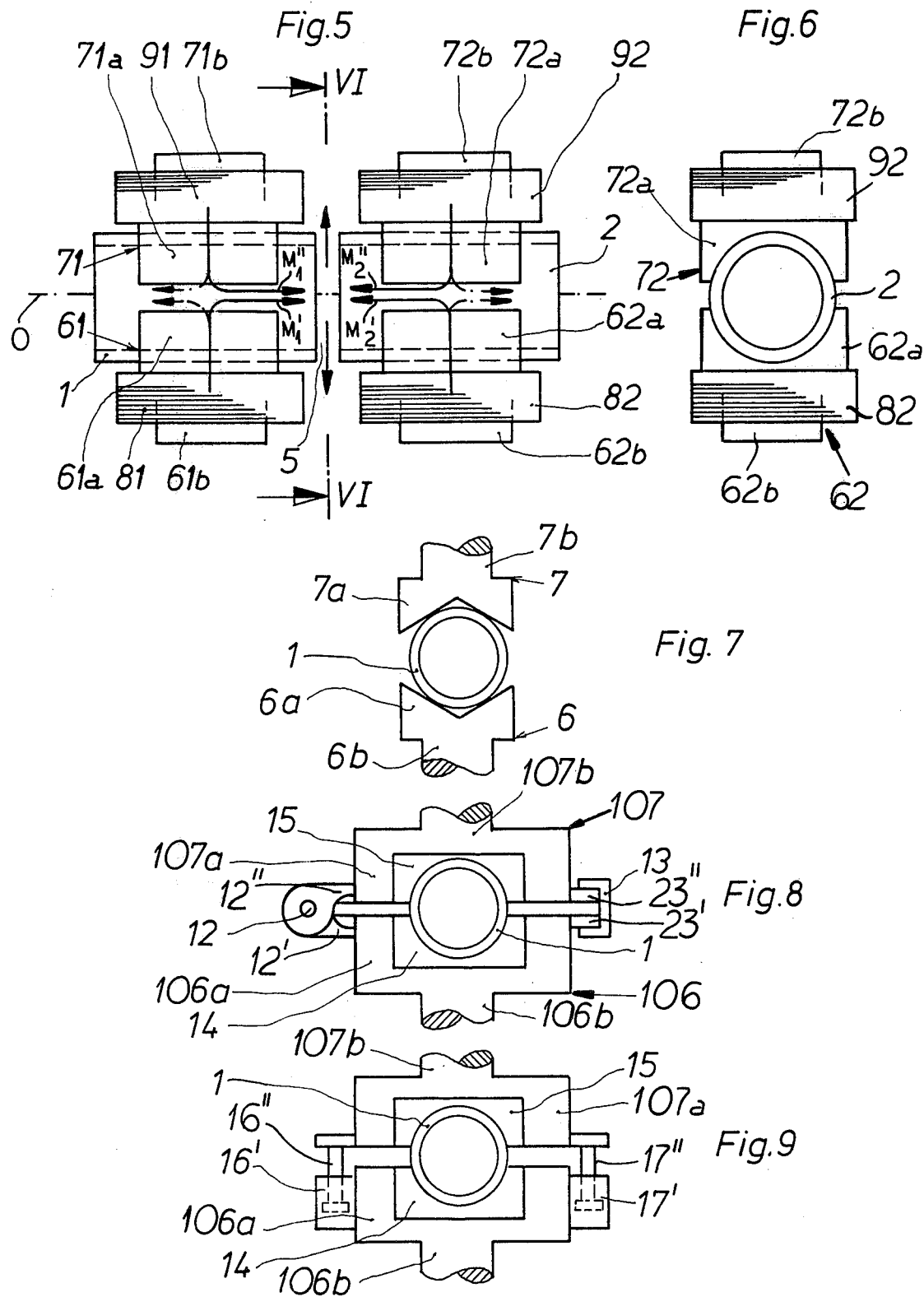

DEVICE FOR ARC-WELDING FERROMAGNETIC WORKPIECES UNDER THE CONTROL OF A MAGNETIC FIELD

FIELD OF THE INVENTION

Our present invention relates to a device for the arc-welding of two ferromagnetic workpieces under the control of a magnetic field.

BACKGROUND OF THE INVENTION

It is known to weld two coaxial ferromagnetic workpieces, which are axially separated by a narrow peripheral gap, with the aid of an arc moving along that gap under the control of a generally radial magnetic field traversing the gap substantially at right angles to the developing seam. Such a field can be conventionally generated by surrounding each workpiece with an electromagnetic winding energized with such polarity that the resulting axially oriented lines of magnetic force buck each other and are effectively deflected onto a radial path forming part of a respective magnetic loop. These windings can be disposed at some distance from the gap, and thus from the region of the weld seam, but the introduction of the workpieces into the windings and especially their withdrawal after welding may create problems; moreover, the workpieces must also be retained in their aligned position by suitable holders whose emplacement may be impeded by the presence of these windings.

It has also been proposed (see, for example, German published application No. 28 15 751) to establish the desired magnetic field with the aid of two or more electromagnets disposed at angularly spaced locations in the plane of the inter-workpiece gap. These electromagnets have pole pieces whose arcuate faces are centered on the workpiece axis and closely approach the region of the weld seam with small angular separation from one another. Because of their close proximity to the location of the arc, these pole faces are susceptible to contamination by weld spatter; special holders must again be provided for engaging and centering the workpieces

OBJECTS OF THE INVENTION

An object of our present invention, therefore, is to provide an arc-welding device with more effective means for producing the desired magnetic field in a convenient manner regardless of the profile or length of the workpieces involved.

A related object is to provide means in such a device with the dual task of retaining the workpieces while generating the magnetic field.

SUMMARY OF THE INVENTION

We realize these objects, in accordance with our present invention, by the provision of holding means for retaining the workpieces in a coaxial position, the holding means including a set of gripper jaws which are engageable with one of these workpieces while being centered on the axis thereof. We further provide magnetizing means juxtaposed with the jaws for establishing magnetic poles of like polarity at confronting jaw faces, thereby setting up a pair of mutually opposite magnetic fields contributing to a flux which permeates the engaged workpiece in an axial direction, and deflecting means adjacent the transverse plane containing the peripheral gap for orienting this axial flux generally radially across that gap. It should be noted that the workpieces need not be symmetrical about their axis and need not be entirely centered thereon.

Pursuant to a more particular feature of our invention, the deflecting means may comprise a source of an axially oriented second magnetic field which bucks the field generated by the magnetizing means and which may include a second set of gripper jaws forming part of the holding means and engaging the other workpiece, the latter jaws being also centered on the workpiece axis and being magnetized with the same polarity as those of the first set.

Alternatively, the deflecting means may comprise a set of pole shoes of opposite polarity juxtaposed with an extension of each jaw carrying an excitation winding, these pole shoes approaching the peripheral gap with a polarity opposite that of the jaws. Since the pole shoes do not constitute the primary source of the magnetic field, they can be positioned somewhat more remote from the region of the weld seam than in the conventional arrangement referred to above.

The jaws themselves, or liners insertable into them, may have a wide variety of shapes designed to accommodate workpieces of different sizes and configurations. Advantageously, the jaws are relatively displaceable in a generally radial direction between an open position, facilitating the emplacement or the removal of a workpiece, and a closed position firmly holding the workpiece in place.

BRIEF DESCRIPTION OF THE DRAWING

The above and other features of our invention will now be described in detail with reference to the accompanying drawing in which:

FIG. 1 is a somewhat schematic side-elevational view of a conventional device for the arc-welding of a pair of ferromagnetic workpieces;

FIG. 2 is a front view of one of the workpieces taken on the line II—II of FIG. 1;

FIG. 3 is a side-elevational view similar to that of FIG. 1 but showing a device embodying our invention;

FIG. 4 is a front view taken on the line IV—IV of FIG. 3;

FIG. 5 is another side-elevational view similar to that of FIG. 1, illustrating a further embodiment;

FIG. 6 is a front view taken on the line VI—VI of FIG. 5;

FIGS. 7, 8 and 9 are front views of several sets of jaws usable with a device according to our invention;

SPECIFIC DESCRIPTION

Figure 10:
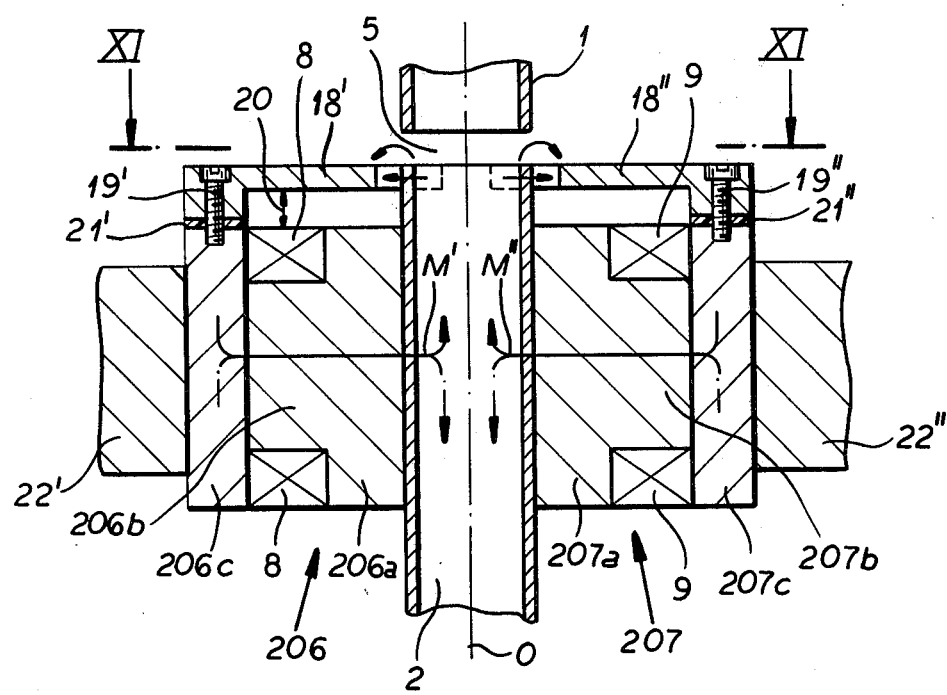
FIG. 10 is an axial sectional view of yet another embodiment of our invention.

Reference will first be made to FIGS. 1 and 2 showing a pair of tubular workpieces 1, 2 centered on a common axis 0, each of these workpieces being surrounded by a respective winding 3, 4 energized from a nonillustrated source of direct current so as to generate two bucking magnetic fields as indicated by arrows $M_1$, $M_2$. The lines of force of these fields, concentrated mainly in the workpieces, emerge from their confronting faces and continue radially outward through an intervening peripheral gap 5 located in a transverse plane P (FIG. 3), these lines reentering the respective workpieces at their remote ends. Obviously, the polarity of the fields $M_1$ and $M_2$ could also be inverted. Not shown in FIGS. 1 and 2 are the means needed for holding the two workpieces in their aligned position within windings 3 and 4.

When an arc is struck across the gap 5, it travels along that gap in a direction determined by the polarity of the magnetic fields to form an annular weld seam in a transverse plane. The two workpieces so unified can be extracted from the coils 3, 4 only in the axial direction, which is inconvenient if both workpieces are of considerable length.

In FIGS. 3 and 4 we have shown a tubular workpiece 1, similar to that of FIG. 1, and a cup-shaped workpiece 2' of like diameter to be welded onto tube 1. This tube is engaged, during the welding operation, by a pair of electromagnets 6 and 7 with respective pole shoes 6a and 7a designed as gripping jaws of ferromagnetic material, the latter having extensions in the form of ferromagnetic stems 6b, 7b surrounded by respective excitation windings 8 and 9. With proper energization of these windings from a nonillustrated source of direct current, jaws 6a and 6b are permeated by lines of force of respective magnetic fields $M_1'$ and $M_1''$ opposing each other at the confronting pole faces. These lines of force are diverted into an axial direction within workpiece 1, a significant part of the resulting field being oriented toward the gap 5 where the resulting axial flux is bucked by an opposing field $M_2$ generated by a winding 11 which is centered on axis 0 and surrounds the workpiece 2'. The latter is received in a ferromagnetic holder 10 forming a seat therefor and supporting the coil 11.

The two oppositely oriented fields meeting at the gap 5 again produce generally radial lines of force traversing that gap to facilitate the formation of a weld seam by a traveling arc in a manner known per se.

In FIGS. 5 and 6, where two tubular workpieces 1 and 2 are again to be welded to each other, these workpieces are respectively engaged by identical pairs of jaws 61a, 71a and 62a, 72a forming part of electromagnets 61, 71 and 62, 72. Stems 61b, 71b and 62b, 72b of these jaws are again surrounded by respective excitation windings 81, 91 and 82, 92. With the pole faces of all four jaws magnetized with the same polarity, the resulting lines of force $M_1'$, $M_1''$ and $M_2'$, $M_2''$ contribute again to an axial flux deflected in a substantially radial direction through the intervening gap 5 to control the formation of a weld seam.

FIG. 7 is a front view, in the axial direction, of the electromagnets 6 and 7 of FIG. 3 (with windings omitted) which can also be representative of magnets 61, 71 and 62, 72 of FIGS. 5 and 6. The jaws 6a, 7a are provided in this instance with beveled pole faces adapted to engage workpieces of different diameters.

In FIG. 8 we have shown two modified electromagnets 106, 107 with jaws 106a, 107a having stems 106b, 107b, these jaws being designed as yokes lined with replaceable inserts 14 and 15 whose substantially semicircular recesses conform to the radius of an associated workpiece 1. The two yokes 106a, 107a are articulated to each other by hinge members 12', 12'' that are interconnected by a pintle 12; the jaws, therefore, can be swung apart about pintle 12 to facilitate the insertion and removal of the workpiece. A clamp 13 engages lugs 23', 23'', on the opposite sides of jaws 106a and 107a in their illustrated closure position.

FIG. 9 shows the jaws 106a, 107a provided with a different clamping mechanism comprising a pair of fluidic jacks with cylinders 16', 17' secured to jaw 106a and pistons 16'', 17'' connected with jaw 107a. Similar jacks, or equivalent clamping means such as solenoids, could also be used with the jaws 6a and 7a of FIG. 7. Naturally, the electromagnets 106 and 107 of FIGS. 8 and 9 may be used with either or both of the workpieces shown in FIGS. 3-6.

In FIG. 10 we have shown a tubular workpiece 2 engaged by a pair of electromagnetic grippers 206 and 207 whose jaws 206a, 207a have extensions in the form of necks 206b, 207b and heads 206c, 207c; the necks 206b and 207b are surrounded by respective excitation windings 8 and 9. A pair of ancillary pole shoes 18' and 18'' extend from heads 206c and 207c toward the gap 5 in order to serve as deflectors for the lines of force of magnetic fields M' and M'' respectively generated by coils 8 and 9. These pole shoes can be detachably secured to the respective jaw extensions with the aid of screws 19', 19'' (see also FIG. 11) and with interposition of thin nonmagnetic spacers 21', 21'' which facilitate their detachment from the jaw head and also help maintain a suitable distance 20 of these pole shoes from the corresponding coils 8, 9. We have found that the desired radial orientation of the magnetic field in the region of gap 5 can be obtained even when the arcuate faces of pole shoes 18' and 18'' are slightly offset from gap 5 in either axial direction, e.g. by approximately the width of the pole shoes ranging between 2 and 4 mm, for example; such an offset, here toward the engaged workpiece 2, is shown in FIG. 10. The other workpiece 1 need not be provided with additional magnetizing means such as the coil 11 of FIGS. 3 and 4 or a separate set of magnetic jaws as in FIGS. 5 and 6. The arcuate faces of pole shoes 18' and 18'', whose polarity is opposite that of gripper jaws 206a and 207a, each encircle the associated workpiece 2 over almost 180°. It will be noted that these pole faces are well spaced from gap 5 even when the gripper jaws are closed.

It will be apparent that the alternate magnetic paths indicated in dot-dash lines in FIGS. 3, 5 and 10, extending through the remote ends of the workpieces, should be kept as free as possible from ferromagnetic material so as not unduly to weaken the magnetic lines of force traversing the inter-workpiece gap 5.

Figure 11:
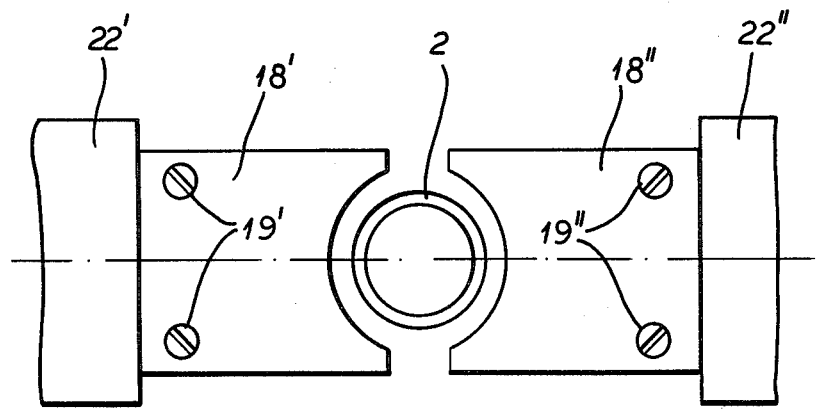
FIG. 11 is a front view taken on the line XI—XI of FIG. 10.

In FIGS. 10 and 11 we have also shown a pair of clamp jaws 22', 22'' which may be part of a fluidic or electromagnetic servomechanism generally similar to that represented by the jacks of FIG. 9. The pole shoes 18' and 18'' could also be attached directly to the clamp jaws 22' and 22'', if they consist of ferrous metal, rather than to the gripper heads 206c and 207c.

We claim:

1. A device for welding two workpieces centered on a common axis and separated by a peripheral gap in a transverse plane across which a weld seam is to be formed by an arc moving along said gap, comprising:

holding means for retaining said workpieces in a coaxial position, said holding means including a set of gripper jaws of ferromagnetic material centered on said axis for engaging one of said workpieces;

magnetizing means including excitation coils wound on respective extensions of said jaws perpendicular to said axis for establishing magnetic poles of like polarity at confronting faces of said jaws, thereby setting up two mutually opposite radially oriented magnetic fields contributing to a flux which permeates the engaged workpiece in an axial direction between said jaws and said gap; and deflecting means adjacent said transverse plane for orienting said flux generally radially across said gap.

2. A device as defined in claim 1 wherein said deflecting means comprises a source of an axially oriented second field bucking said flux.

3. A device as defined in claim 2 wherein said source includes a second set of jaws, centered on said axis, forming part of said holding means and engaging the other of said workpieces, the jaws of said second set being magnetized with the same polarity as the jaws of the first set.

4. A device as defined in claim 1 wherein said deflecting means comprises a set of pole shoes of opposite polarity juxtaposed with said extensions and approaching said peripheral gap.

5. A device as defined in claim 4 wherein said pole shoes are detachably secured to said extensions by way of thin layers of nonmagnetic material.

6. A device as defined in claim 1, 2, 3, 4 or 5 wherein said jaws are relatively displaceable in a generally radial direction between an open and a closed position.

7. A device as defined in claim 6 wherein said jaws are hingedly interconnected.

8. A device as defined in claim 6 wherein said jaws are linked by a clamping mechanism.

* * * * *